United States Patent [11] 3,586,108

| [72] | Inventors | George H. Wedgeworth;<br>Vernie A. Boots, both of Belle Glade, Fla. |
|---|---|---|
| [21] | Appl. No. | 862,810 |
| [22] | Filed | Oct. 1, 1969 |
| [45] | Patented | June 22, 1971 |
| [73] | Assignee | Florida Celery Exchange<br>Orlando, Fla. |

[54] CELERY-HARVESTING MACHINE
16 Claims, 18 Drawing Figs.

[52] U.S. Cl. ..................................................... 171/32,
171/36, 171/61, 56/327
[51] Int. Cl. ..................................................... A01d 27/04
[50] Field of Search ........................................... 171/27, 28,
29, 31, 32, 36, 37, 38, 42, 21, 22, 61, 62; 56/327

[56] References Cited
UNITED STATES PATENTS
1,306,586  6/1919  Duke........................... 171/38

| 2,554,066 | 5/1951 | Silva............................. | 171/22 |
| 2,585,416 | 2/1952 | Weid et al..................... | 171/29 |
| 2,833,358 | 5/1958 | Lust .............................. | 171/61 |
| 3,442,071 | 6/1969 | Duda............................. | 56/327 |

Primary Examiner—Antonio F. Guida
Attorney—Mason, Fenwick & Lawrence

ABSTRACT: A celery-harvesting machine in the form of a self-propelled vehicle supporting a plurality of harvester units each such unit having two grip belts for engaging the top of a celery plant and lifting the plant from the soil and cutting means for severing the plant from its roots immediately below ground level following gripping of the plant by the grip belt with a lower outer foliage removing pair of belts for subsequently engaging the lower portion of the plant for stripping the outer foliage from the plant and transversely extending conveyor means for receiving the harvested plant and conveying the harvested plant to a central unloading station.

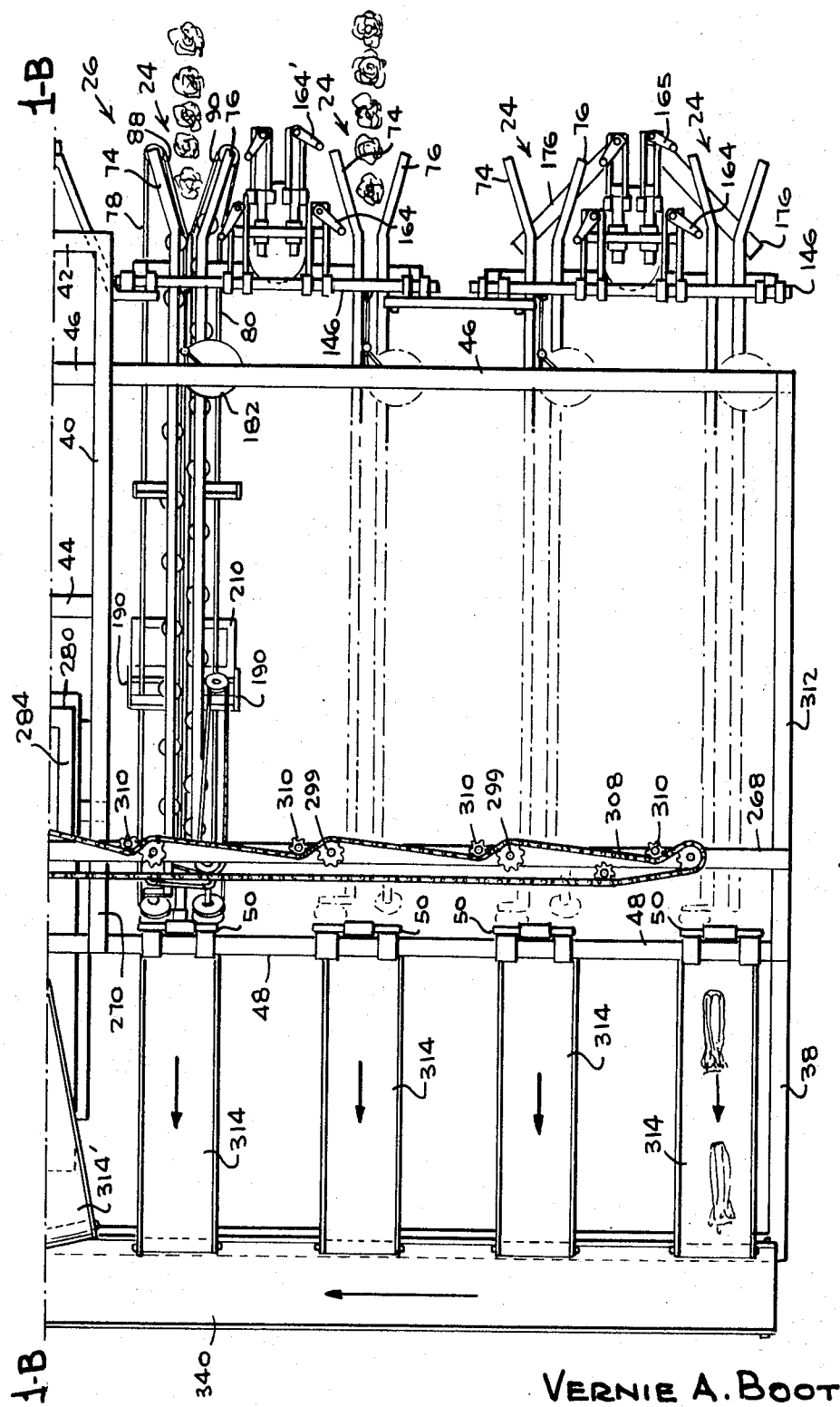

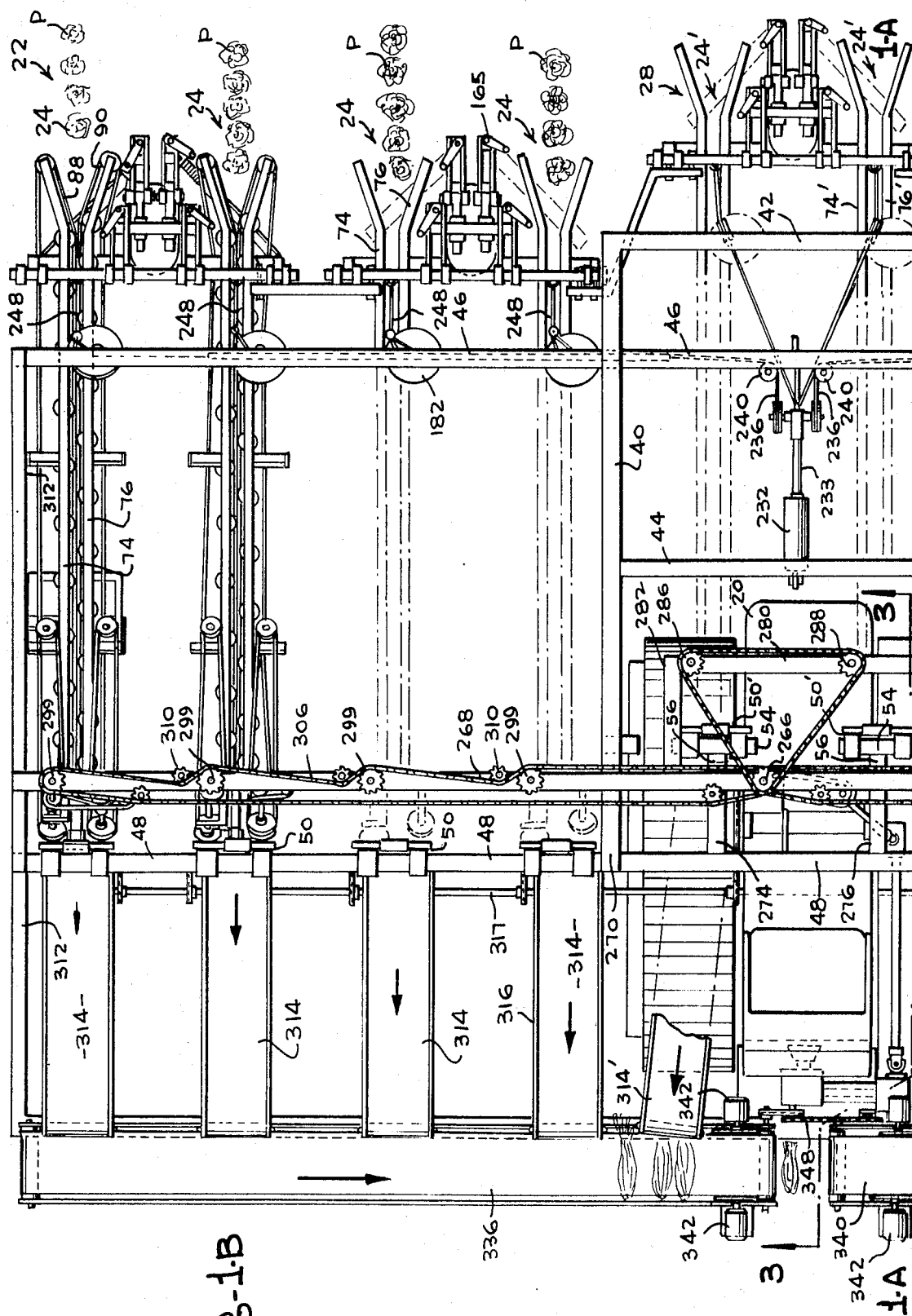

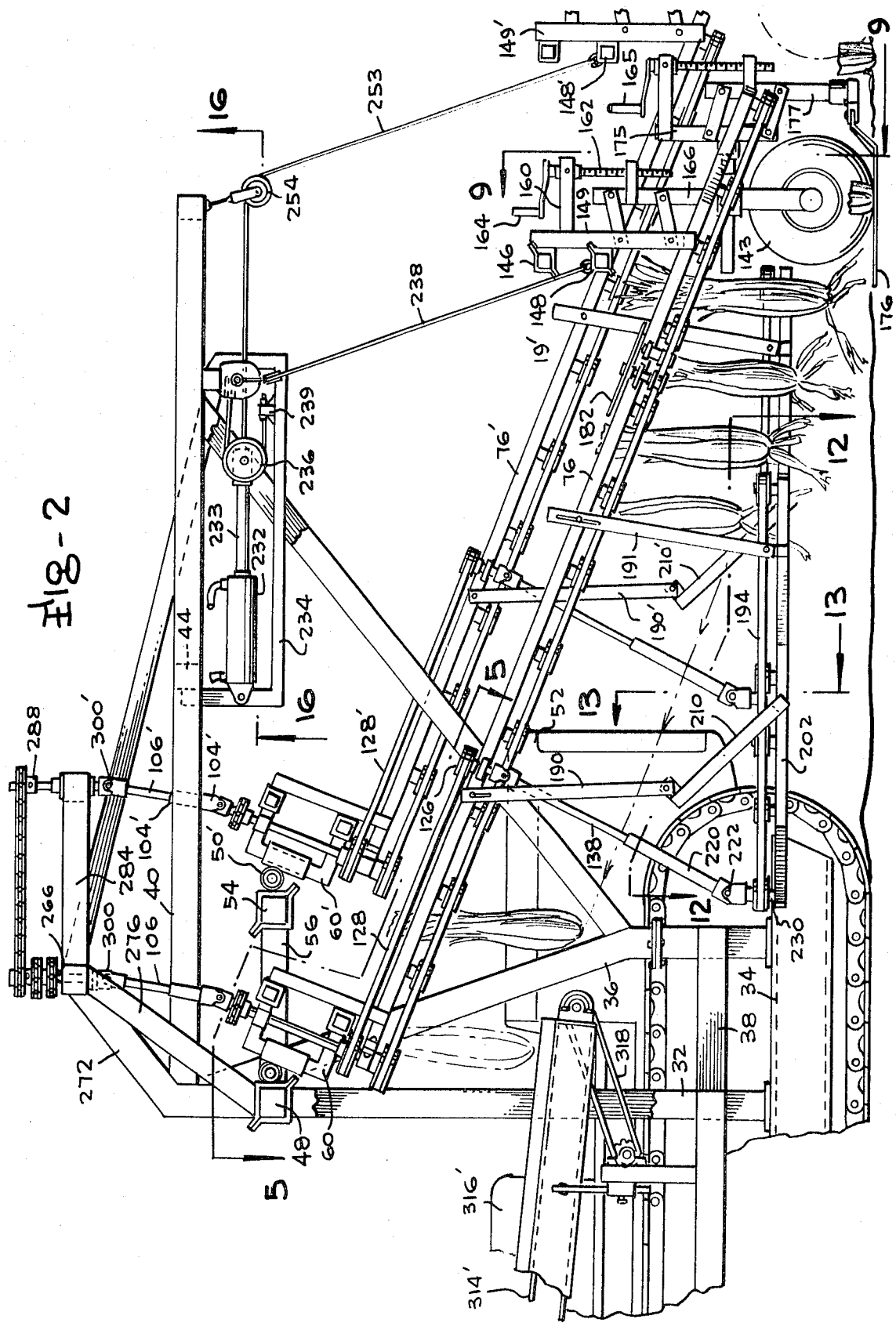

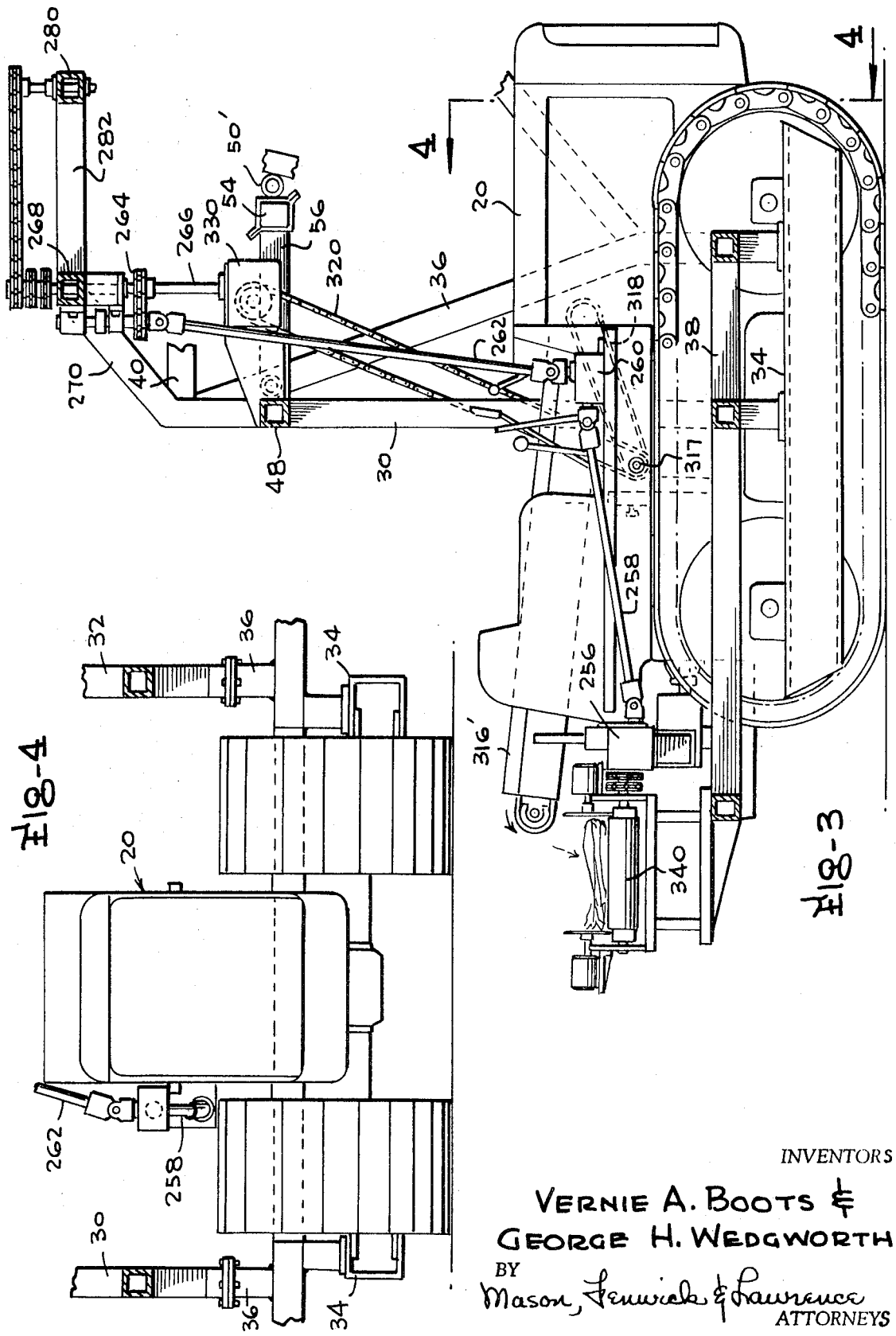

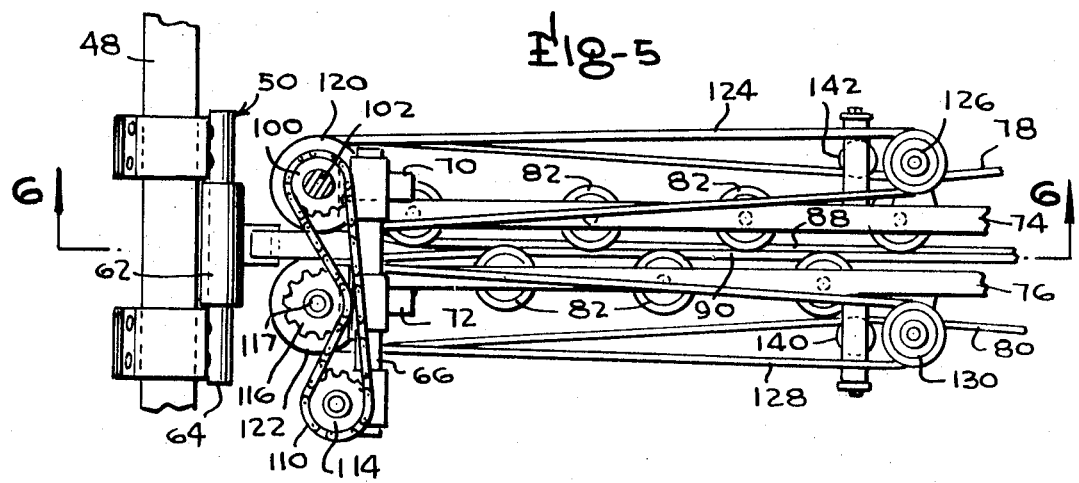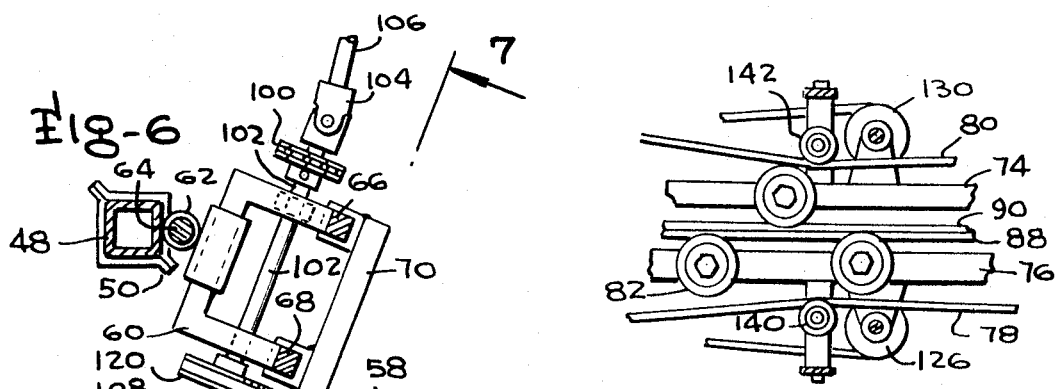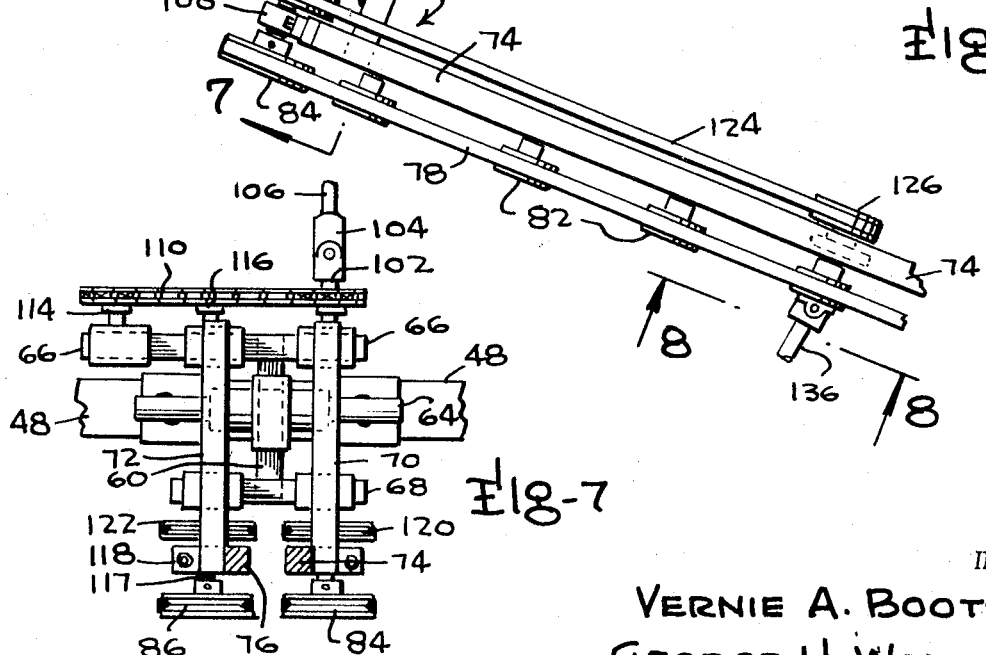

INVENTORS
VERNIE A. BOOTS &
GEORGE H. WEDGWORTH

BY Mason, Fenwick & Lawrence
ATTORNEYS

INVENTORS
VERNIE A. BOOTS &
GEORGE H. WEDGWORTH
BY Mason, Fenwick & Lawrence
ATTORNEYS

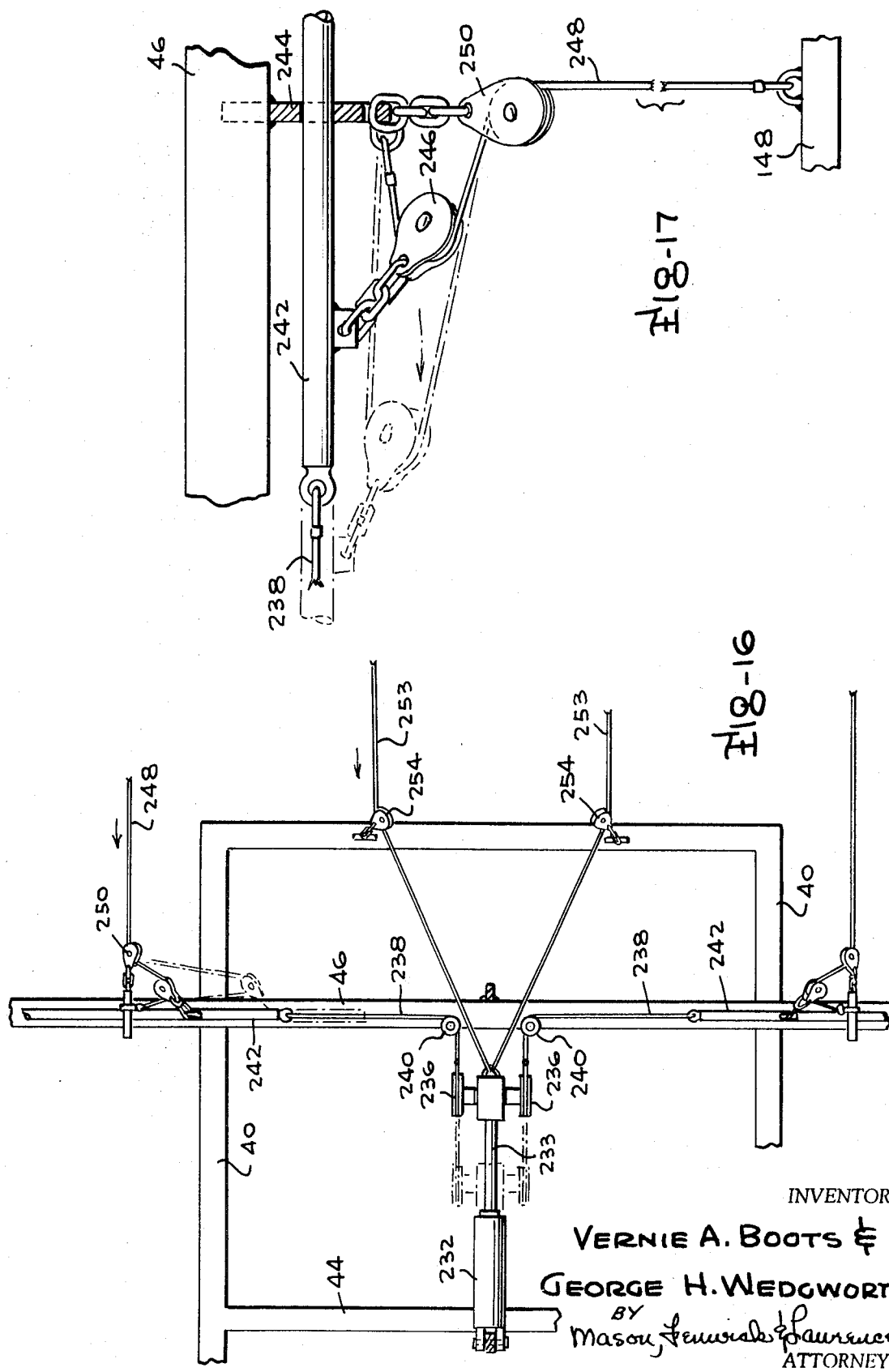

CELERY-HARVESTING MACHINE

BACKGROUND OF THE INVENTION

This invention is in the area of agricultural machines and is directed to a harvesting machine specifically for the purpose of harvesting celery in the field. Moreover, the invention is directed to a driven self-contained celery-harvesting machine capable of removing the celery form the soil, trimming the roots from the stalk, removing the outer leaves from the stalk and subsequently sizing the stalk to a given length.

Numerous devices have been proposed in the past for the purpose of enabling the mechanical harvesting of celery. However, none of the prior-known devices has proven to be successful in that such have suffered from a number of deficiencies of both economic and functional nature. For example, some of the prior-known machines have provided only partial mechanization of the steps necessary for celery harvesting an none of the known prior machines adequately removes the outer swirl of leaves from the stalk.

Yet another problem not met by the prior devices is that of effecting a uniform sizing of all of the stalks during the harvesting operation.

The instant invention solves these and still other problems through the provision of a moving vehicle which can harvest multiple rows of celery as it moves along the rows by first grasping the plants, severing the roots from the plants and then automatically removing the outer swirl of leaves from the plants. The plants are then conveyed past sizing cutters which cut the plants to uniform length and subsequently deposit the plants at a central unloading station on the rear of the machine.

SUMMARY OF THE INVENTION

It is the primary object of this invention to provide a new and improved celery-harvesting machine capable of efficiently and economically harvesting celery.

Obtainment of the object of this invention is enabled through the provision of a celery-harvesting machine comprising a self-driven vehicle supporting a plurality of harvester units. Each harvester unit is associated with a row of celery in the field and moves along each row for the harvesting of plants in the row. A pair of aligned driven conveyor belts inclined upwardly from the front to rear are oriented so as to provide inwardly facing flights between which each plant of each ro is received, grasped and lifted upwardly from the soil. Concurrently with the grasping of each plant between the inwardly facing flights, a severing knife engages the plant immediately below the soil surface to sever the stalk from the roots of the plant. Subsequent to the severing operation, the plant is lifted upwardly by the gripping belts with the lowermost portion of the plant entering between the pair of foliage-removing driven belts. The foliage-removing belts are aligned and have inwardly facing flights between which the lower portion of each plant passes. The lower foliage-engaging belts strip the outer leaves from the stalk as the stalk is lifted upwardly past the lower belts by the upper gripping belts.

Drive means are provided for driving all of the harvester units in unison and means are provided for pivotally lifting the forward ends of each unit upwardly to enable turning and maneuvering of the harvester at the end of the row or during any other nonharvesting movement of the vehicle such as when moving from one field to another field.

DESCRIPTION OF THE DRAWINGS

FIG. 1A is a top plan view of one side of the preferred embodiment of the invention illustrating a transversely extending bank of harvester units;

FIG. 1B is a top plan view of the remainder of the preferred embodiment not shown in FIG. 1A;

FIG. 2 is a side elevational view of the forward end of the preferred embodiment;

FIG. 3 is a sectional view taken along lines 3-3 of FIG. 1B;

FIG. 4 is a sectional view taken along lines 4-4 of FIG. 3;

FIG. 5 is a sectional view taken along line 5-5 of FIG. 2;

FIG. 6 is a sectional view taken along lines 6-6 of FIG. 5;

FIG. 7 is a sectional view taken along lines 7-7 of FIG. ';

FIG. 8 is a sectional view taken along lines 8-8 of FIG. 6;

FIG. 16 is a top plan view of harvester unit lift means for lifting the forward end of each harvester unit and FIG. 17 is an enlarged portion of a part of FIG. 16 illustrating the parts therein in greater detail.

DESCRIPTION OF THE PREFERRED EMBODIMENT

Figure 9:
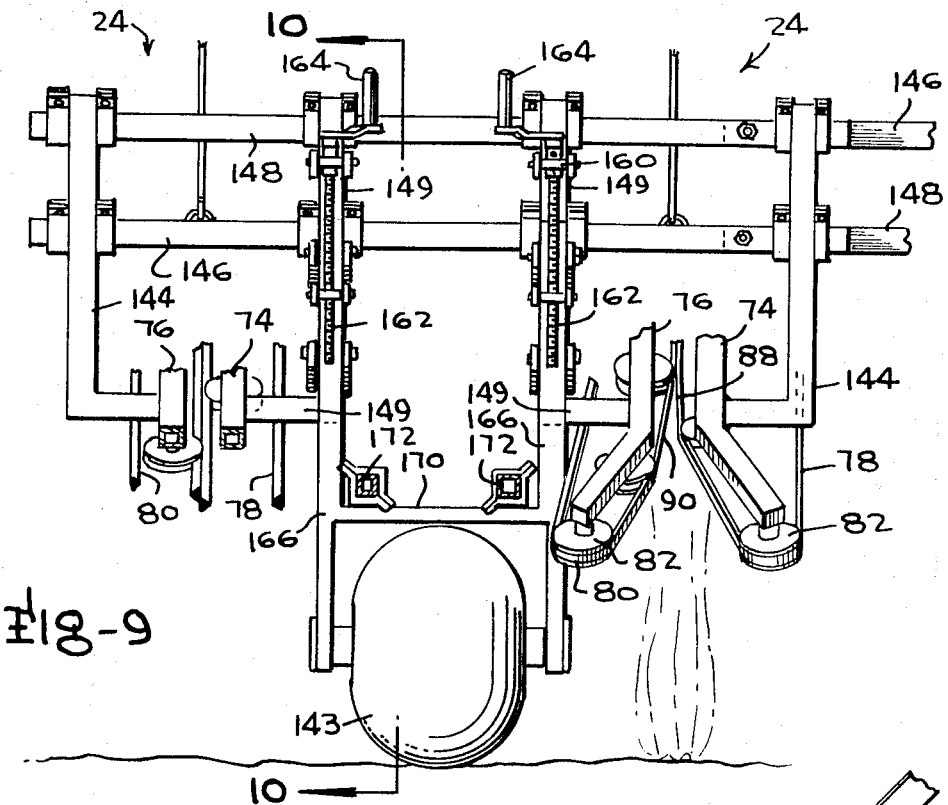
FIG. 9 is a sectional view taken along lines 9-9 of FIG. 2.

Attention is initially invited to FIGS. 1B and 3 which illustrate a self-propelled vehicle in the form of a crawler tractor 20 to which the other elements of the preferred embodiment are attached. FIGS. 1A and 1B in conjunction provide a plan view of the entire device in which tractor 20 the support for a plurality of individual harvester units grouped in three distinct groups or banks. Specifically, a left bank 22 of harvester units consisting of four individual units 24, a right bank 26 of harvester units 24 extending transversely to the right from vehicle 20. The right bank 26 also consists of four individual harvester units 24 that are identical in every respect to the harvester units of the left bank 22. Additionally, a central bank 28 of harvester units consisting of two harvester units 24' extends forwardly from tractor 20 as best shown in FIG. 1B.

The right, left and central harvester unit banks are supported from the tractor 20 by means of first and second main vertical support stanchions 30 and 32 respectively which are connected to the tractor 20 at their lowermost ends by means of support platforms 34 attached to the side of the tractor. The main stanchions 30, 32 are of heavy construction and are individually braced by brace members 36 which are also connected to support platforms 34. Additionally, a horizontal brace 38 extends between each of the braces 36 and their respective main vertical support stanchions as best illustrated in FIG. 2 and also extends t the rear of the tractor as shown in FIG. 3.

A pair of horizontal support arms 40 FIGS. 1A and 1B) extend forwardly from the main stanchions 30 and 32 for providing support for the front ends of the individual harvester units in a manner to be discussed in detail hereinafter. The forward ends of each of the horizontal support arms 40 are connected by a forward brace member 42. Additionally, an intermediate horizontal brace 44 extends transversely between the horizontal support arms 40 as shown in FIG. 1B.

A horizontal lift beam 46 extends transversely from a position adjacent the forward ends of the support arms 40 for the purpose of providing support for the forward ends of each of the harvester units of the left bank 22 and the right bank 26 as best illustrated in FIGS. 1A and 1B. Support for the rear portions of the harvester units of the right and left banks is provided by a horizontal pivot bearing support beam 48 extending transversely outwardly from and between the main vertical support stanchions 30 and 32 and extending for the width of the harvester. A plurality of pivot bearings 50 (FIGS. 5 and 6) are spaced along the pivot bearing support beam 48 in alignment with each of the harvester units 24 of the left and right banks 22 and 26 as shown in FIGS. 1A and 1B.

The individual harvester units 24' of the central bank of harvester units 28 are identical with the harvester units 24 of the right and left banks 22 and 26; however, it is necessary that the harvester units 24' of the central bank 28 be positioned forwardly of the other harvester units due to the necessity for clearing the radiator 52 of the tractor 20 as best illustrated in FIG. 2. There are no structural differences between the harvester units 24' and the units 24 and the same numerical designators which have been primed are consequently applied to all of the harvester units of the central bank 28 of harvester units.

The forward offset of the harvester units 24' of the central bank 28 requires that an auxiliary pivot bearing support in the form of two stub beams 54 be provided for supporting pivot bearings 50' which, in turn, pivotally support the rearmost ends of the two central units 24'. Each of the auxiliary pivot bearing support beams 54 24 connected to the portion of the main pivot bearing support beam 48 located between the main vertical stanchions 30 and 32 by means of a cantilever beam 56 as best illustrated in FIG. 1B. A pivot bearing 50' is attached to each of the auxiliary pivot bearing support beams 54 in the same manner that pivot bearings 50 of the other harvester units 24 are attached to beam 48.

Details of the harvester units will now be discussed with reference to parts of the units of the left bank and the right bank which are identified by unprimed numerical designators; however, the following comments are equally applicable to the elements of the central bank which are identified by primed designators.

Each harvester unit includes a main pivot frame 58 pivotally connected at its rearmost end to pivot bearings 50 in the case of the harvester units 24 and to pivot bearings 50' in the case of harvester units 24'. The connection to the pivot bearings is made by means of a ridged C-shaped support bracket 60 (FIG. 6) which is welded to a sleeve 62 of bearing 50 which is, in turn, pivoted on a fixed rod 64 of the bearing. An upper transverse rod 66 is welded to the upper side of bracket 60 and a lower transverse rod 68 is welded to the lower end of bracket 60 as best illustrated in FIGS. 6 and 7 of the drawings. First and second guide frame support rods 70 and 72 are connected to the upper and lower transverse rods 66 and 68 as best shown in FIG. 7. The first and second guide frame support rods respectively provide support for first and second guide frames 74 and 76 connected to the lower ends of the guide frame support rods as shown in FIGS. 6 and 7. Therefore, it will be seen that the entire main pivot frame consisting of elements 60, 70, 72, 74, 76 etc. is pivotable about the axis of rod 64 of the pivot bearing 50. The purpose for providing this pivotable construction will become more apparent hereinafter.

Guide frames 74 and 76 provide the support for a grip belt conveyor formed of two driven grip belts 78 and 80 respectively supported beneath the guide frames 74 and 76. The belts 78 and 80 are supported beneath their respective guide frames by means of idlers 82 and drive pulleys 84 and 86 (FIG. 7) respectively associated with the belts 78 and 80.

The belts 78 and 80 cooperate to form a grip belt conveyor system having inwardly facing flights 88 and 90 moving upwardly from front to rear and between which the celery plants being harvested are grasped and conveyed in a manner to be discussed hereinafter in detail. Drive to the belts 78 and 80 is provided by means of a drive input sprocket 100 keyed to a driven shaft 102 which is driven by means of a universal joint 104 which is driven by a drive shaft 106. Shaft 102 is mounted for rotation in bearing means attached to C-shaped bracket 60 as shown in FIG. 6. The lower end of shaft 102 extends through a bearing 108 on the rearmost end of guide frames 74 and has drive pulley 84 keyed to its lowermost extremity immediately below bearing 108 as shown in FIG. 6. Consequently, power for driving belt 78 is conveyed directly to the belt by means of the shaft 102 and drive pulley 84.

However, it is also necessary to drive belt 80 in a direction so that the inwardly facing flights 88 and 90 will move upwardly in the same direction (right to left in FIGS. 5 and 8). This drive to belt 80 is enabled by means of a drive chain 110 extending about the drive input sprocket 100 and an idler sprocket 114 mounted on the end of the upper transverse rod 66 as best illustrated in FIGS. 5 and 7. A drive sprocket 116 is mounted on the upper end of a second driven shaft 117 supported by the C-shaped bracket 60 and extending downwardly through a rotary bearing 118 on the rearmost end of the guide frame 76. Second drive pulley 86 is keyed to the lower end of shaft 117 in the same manner as pulley 84 is keyed to the lower end of shaft 102 so that the pulleys 84 and 86 are consequently rotated in unison but in opposite directions.

Additionally, it should be noted that first an second output drive pulleys 120 and 122 are mounted on shafts 102 and 117 immediately above bearings 108 and 118 respectively. A drive belt 124 (FIG. 6) extends from pulley 120 over a pulley 126 attached to the sides of guide frame 74. Similarly, a belt 128 (FIG. 5) extends from the pulley 122 over pulley 130 attached to the aide of guide frame 76. Pulleys 126 and 130 are respectively keyed on downwardly extending shafts 132 and 134 which are connected on their lower ends to output drive shafts 136 and 138 by means of a universal joint shown in FIG. 6.

Additionally, it should be noted that bracket mounted idler pulleys 140 and 142 engage the outer flights of belts 80 and 78 for positioning same inwardly so that they do not contact shafts 132 and 134. Idlers 140 and 142 are mounted on brackets attached to the frame 74 and 76 respectively as shown in FIG. 8.

Turning now to FIG. 9, it will be seen that the forward ends of the guide frames 76 and 74 are outwardly spread for the purpose of guiding the top of a celery plant inwardly between the inwardly facing flights 88 and 90. It should be noted that each pair of adjacent harvester units 24 is provided with a ground-engaging wheel 143 located between the harvester unit.

Figure 10:
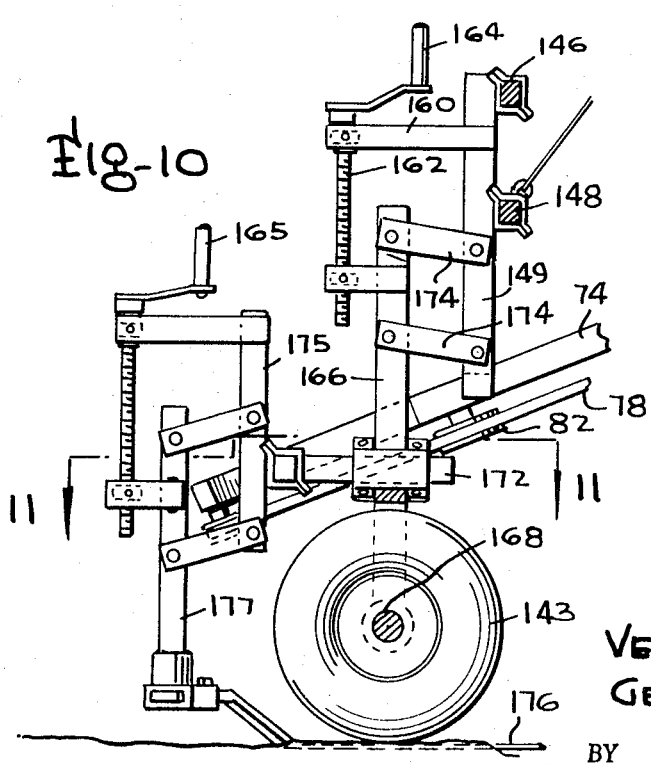
FIG. 10 is a sectional view taken along lines 10-10 of FIG. 9.
Figure 11:
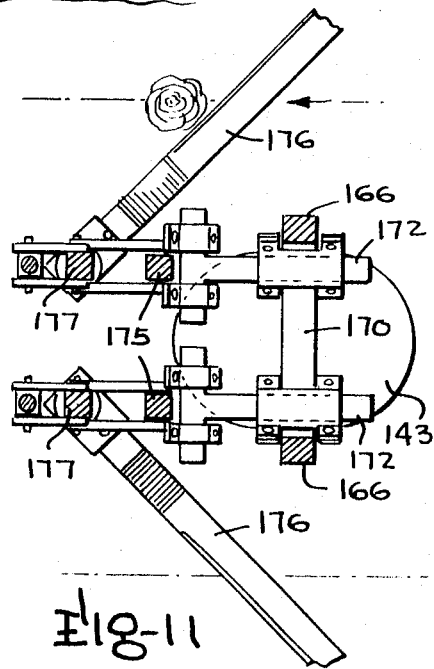
FIG. 11 is a sectional view taken along lines 11-11 of FIG. 10.

Right-angle brackets 144 are connected to the exterior or outer sides of the respective guide frames 72 of the right-hand unit and 74 of the left-hand unit illustrated in FIG. 9. The upper ends of the right-angle brackets 44 are connected to a pair of elevator rods 146 and 148. Similarly, the interior guide frames 76 and 74 of the two harvester units shown in FIG. 9 are connected on their inwardly facing sides to a similar right-angle bracket 149. Each of the right-angle brackets 149 has a forwardly extending bracket 160 (FIG. 10) which supports a pivotable bearing in which an adjustment screw 162 with a handle 164 keyed to its upper end is mounted for rotation. Each of the adjustment screws 162 is threadably connected to an arm extending from a vertical standard 166. Vertical standard 166 extends downwardly with the axle 168 of wheel 143 being mounted in the lower ends of the two standards 166 illustrated in FIG. 9. Moreover, the two standards are connected by a horizontal brace 170 from which a pair of horizontal adjustable cutter support rods 172 extend (FIG. 10). It should be noted that the standards 166 are connected by a parallelogram linkage 174 to the vertical portion of right-angle bracket 149. Consequently, rotation of the screw 162 serves to move the vertical standard 166 upwardly and downwardly to consequently position the wheel 143 with respect to the guide frames 76, 74 and the grip belts carried thereon. Consequently, when the wheel is engaging the ground, the height of the grip belts above the ground is easily adjustable by rotation of handles 164. This enables adjustment of the harvester for harvesting a wide variety of celery plants varying from small to large size.

Cutter support rods 172 are provided on their forward ends with vertical rods 175 which provide an adjustable support for blade-type cutters 176 attached to the lower ends of adjustable support rods 177. The relationship between the adjustable support rods 177 and the vertical rods 175 is identical to the relationship between standards 166 and the right-angle brackets 149. The height of the blade 176 is adjustable by means of an adjustment handle 165 operable in a manner identical to the handle 164. It is to be further noted that the blades 176 are not only vertically adjustable but can be rotated about the axis of adjustable support rods 177. The blades extend into the row of celery plants being harvested and are mounted so as to ride immediately beneath the ground level for severing the plants at that level as the harvester moves along the rows.

Figure 15:
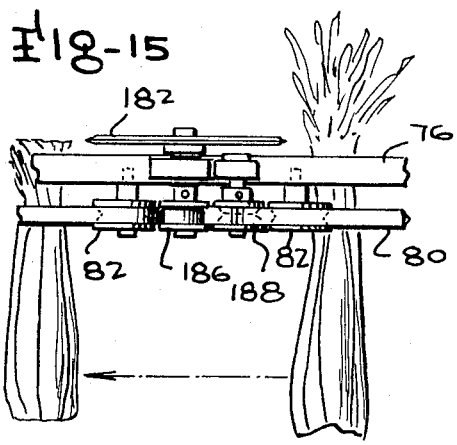
FIG. 15 is a side elevational view of the plant top cutter of FIG. 14.
Figure 14:
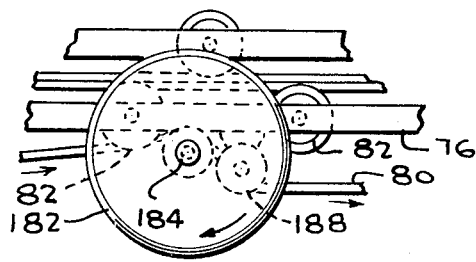
FIG. 14 is a plan view of a plant top cutter associated with the harvester unit.

A top cutter in the form of a rotary blade 182 (FIGS. 2, 14,15) can optionally be mounted on the guide frames 76 for trimming the top of plants conveyed between the belts if desired. The rotary blade 182 is keyed to a shaft 184 which has a drive pulley 186 attached to its lower end and located between two idlers 82 as shown in FIGS. 14 and 15 with a supplemental idler 188 maintaining a driving connection from the belt 80 through the pulley 186 to rotate blade 182. Alternatively, an electric motor could be employed for driving blade 182 if such should be desired.

Figure 12:
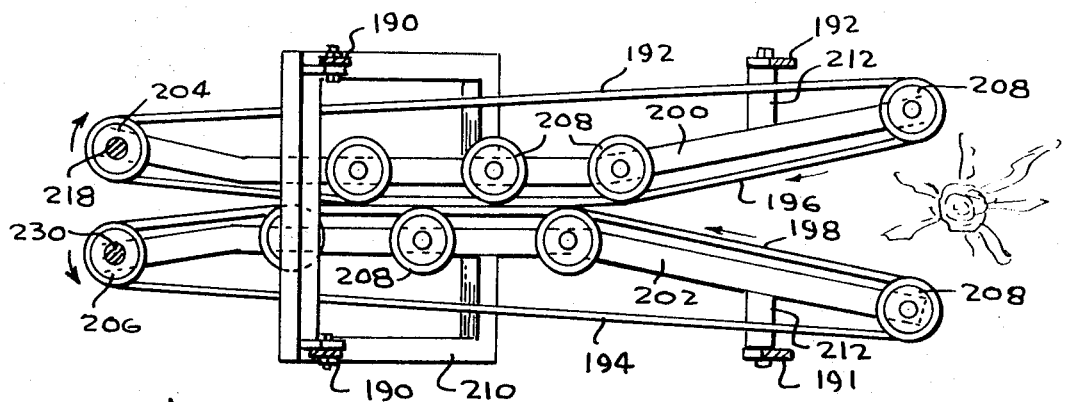
FIG. 12 is a sectional view taken along lines 12-12 of FIG. 2.

Support links 190 are connected to the guide frames 76 and 74 and extend downwardly therefrom as shown in FIG. 2 for providing support for a pair of outer foliage removing driven belts 192 and 194 illustrated in detail in FIG. 12. Belts 192 and 194 have inwardly facing flights 196 and 198 for removing the outer foliage from celery plants in a manner to be made more apparent hereinafter. Belt 192 is supported by a first horizontal stripping frame 200 while belt 194 is supported by a second horizontal stripping frame 202. A driver pulley 204 is mounted on the rear or left end of frame 200 as viewed in FIG. 12 and a driver pulley 206 is mounted on the rear or left end of the second horizontal stripping frame 202 as illustrated in FIG. 12. Idler pulleys 208 are also attached to the frames 200 and 202 and, along with driver pulleys 204 and 206, provide the support for the belts 192 and 194 so that rotation of the driver pulleys serves to drive the inner flights of the belt rearwardly in the direction of the arrows shown in FIG. 12.

Support for the frames 200 and 202 is provided by a support frame 210 which is connected to rearward links 190 and is welded to the outer side of the frames 200 and 202. Forward support links 191 are directly connected to the frames 200 and 202 by means of short horizontal frame elements 212 as best shown in FIG. 12.

Figure 13:
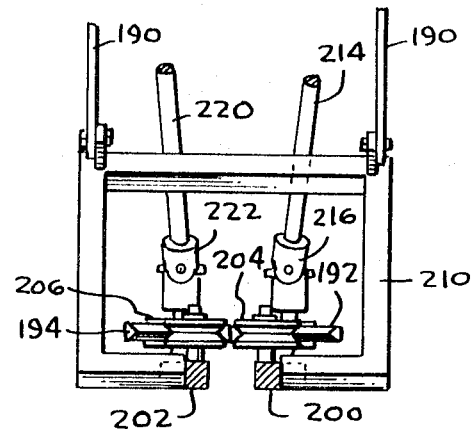
FIG. 13 is a sectional view taken along lines 13-13 of FIG. 2.

Drive to belt 192 is provided from output drive shaft 136 which is slidingly received in a female splined drive tube 214 as shown in FIG. 13. Drive tube 214 is connected to a universal joint 216 which is, in turn, keyed to a shaft 218 which has the driver pulley 204 also keyed thereto. Similarly, drive from the output shaft 138 is conveyed through a second female splined drive tube 220 to a second universal joint 222. The universal joint 222 is connected to a shaft 230 which has the driver pulley 206 keyed thereto. Therefore, it will be seen that the belts 192 and 194 are driven in unison in the direction of the arrows shown in FIG. 12.

It is desirable to pivotally lift the front end of each of the harvester units upwardly out of contact with the ground to enable convenient movement of the vehicle in turning as the harvester reaches the end of a row or at any other desirable time. Lifting of the front ends of the harvester units is accomplished by means of a hydraulic cylinder 232 supported on a cylinder support bracket 234 depending from the intermediate horizontal brace 44 and the horizontal lift means 46 as best illustrated in FIGS. 2 and 16. Hydraulic cylinder 232 has a pair of idler pulleys 236 mounted on the end of its piston rod 233 and over which cables 238 are looped. Each of the cables 238 is connected on one end to a bracket 239 on the cylinder support bracket 234 as shown in FIG. 2. The cables are also looped over the pulley 236 and over a second idler 240 and extend outwardly along the horizontal lift beam 46 for connection to a slip pin 242 (FIG. 17) slidably received within a guide 244 attached to the horizontal lift beam 46. Consequently, activation of the cylinder 232 serves to pull the slip pin 242 inwardly as viewed in FIG. 16 or to the left as viewed in FIG. 17.

A pulley 246 is connected to each of the slip pins 242 as shown in FIG. 17 and a cable 248 passes through pulley 246 and a second pulley 250 connected to the guide 244 and is connected on its other end to the elevator rod 148. Plural pulley units 246, 250 and cables 248 are provided outwardly along the length of the horizontal lift means so that one such unit is provided for each of the harvester units. Consequently, activation of cylinder 232 provides a uniform lifting of all of the harvester units with the left and right banks. The solid line position of the pulley units 246, 250 of FIG. 17 is the position assumed when the harvester units are in their lowered position whereas the dashed line position is that assumed when the units are in their raised position.

Lifting of the harvester units 24' of the central bank is accomplished by means of two cables 253 directly connected to the end of the piston rod 233 and passing through pulleys 254 attached to the lower side of the forward brace member 42 and connected on their ends to the elevator rod 148'. Therefore, actuation of cylinder 232 simultaneously lifts all of the harvester units 24 and 24' of both the right and left banks and the central bank of harvester units.

Power for driving the various grip belt conveyors of each of the harvester units is provided from a power takeoff 256 on tractor 20 (FIG. 3) to a drive shaft 258, a right-angle drive connection 260, a drive shaft 262 and a chain 264 to a main power output drive shaft 266. The shaft 266 extends through and is supported by a transversely extending power drive support beam 268.

Support for the power drive support beam 268 is provided by inclined braces 270 extending forwardly from the top of the main vertical support stanchions 30 and 32. Additional support for power drive support beam 268 is provided by two additional inclined brace members 272 and 276 extending from the horizontal pivot bearing support beam 48 as best shown in FIGS. 1A, 1B and 2.

An auxiliary power drive support beam 280 is mounted forwardly of the power drive support beam 268 by means of forwardly extending braces 282 and 284 connected between the power drive support beam 268 and auxiliary beam 280. Power from the main output drive shaft 266 is supplied by a chain connected to sprockets 286 and 288 mounted on shafts which are supported in bearings in the auxiliary power drive support beam 280 (FIGS. 1B and 2). The lower ends of these shafts are connected to universal joints 300. The universal joints 300 are connected to the drive shafts 106' of each of the harvester units 24' of the central bank. Consequently, driving force is provided at all times to the conveyor belts of the central harvester units.

Drive force to the left bank and right bank of harvester units is provided from the main output drive shaft 266 by a plurality of driven sprockets 299 mounted on journaled shafts extending along the length of the power drive support beam 268 and having universal joints 300 on their lowermost ends. Each harvester unit is provided with one sprocket 299 which receives power for that particular harvester unit. The universal joints 300 are connected to the individual drive shafts 106 which have been previously discussed (see FIG. 6). The driven sprockets 299 for the left bank 22 of harvester units are driven by a chain loop 306 (FIG. 1B) engaging these sprockets and driven by the sprocket on shaft 266 while the sprockets associated with the right bank 24 of harvester units are driven by a chain loop 308 (FIG. 1A) which is identical with the chain loop 306. Moreover, a plurality of idler sprockets 310 are located along the length of the power drive support beam 268 for maintaining the respective chain loops in driving connection with their associated driven sprockets 299.

It should be noted that the outer ends of the horizontal lift beams 46, the power drive support beam 268 and the pivot bearings support beams 48 are connected by bracing frames generally designated 312 in forming the side terminations of the device.

Each of the individual harvester units 24 are provided with individual auxiliary rearward moving conveyors belts 314 which are mounted within trough means 316 and which have their forward ends immediately beneath the rearmost extent of the grip belts 76 and 78 for receiving celery plants dropped from the belts as they part at their rear extent. Power for driving the conveyor belts 314 is from a shaft 317 through which the drive drum for each belt is keyed and which is rotated by means of a chain 320 driven from a right-angle takeoff 330 connected to the lower end of the main output drive shaft 266 as best shown in FIG. 3. Shaft 317 extends across the breadth of both the right and left harvester banks. However, shaft 317 cannot directly drive the harvester units 24' of the central bank due to the forward positioning of the units. Therefore, drive for the conveyors 314' of the central units is provided by a chain 318 connected to a sprocket on shaft 317 and extending forwardly over a drive sprocket for driving the conveyors 314'. It should be noted that conveyors 314' are canted outwardly as best shown in FIGS. 1A and 1B.

A first inwardly feeding conveyor 336 is located beneath the ends of the auxiliary conveyors 314 for receiving celery plants from the auxiliary conveyors of the left bank and the left conveyor 314' of the central bank as shown in FIG. 1B. Conveyor 336 is driven in the direction of the arrows of FIG. 1B so as to receive the celery plants and convey same to a central unloading station generally designated 338. Similarly, a second inwardly feeding conveyor 340 (FIG. 1A) feeds celery plants from the right bank of harvester units and the rightmost harvester conveyor 314' of the central bank of harvesters.

Electric motor driven cutters 343 are optionally located adjacent the innermost ends of the inwardly feeding conveyors 336 and 340 for trimming celery stalks carried by the conveyors. While the cutters 342 are shown with electric motor drives, it should be understood that they could also be driven mechanically from the power takeoff of the tractor. Drive for the inwardly feeding conveyors 336 and 340 is provided by chain means 348 connected from the power takeoff of the vehicle in the manner illustrated in FIG. 1B.

In operation, the vehicle is driven in a direction parallel to the direction of the rows of celery plants P with one harvester unit being associated with each row. Plants entering between the grip belts 78 and 80 are initially grasped by the forward end of the belts and lifted upwardly at the same time that the cutter 176 is severing the roots immediately below the ground level. The plants then move rearwardly upwardly so that the outer swirl of leaves is engaged by the foliage-removing belts 192 and 194 for stripping the outer foliage from the plants. The plants then continue to move upwardly to the rear end of the grip conveyor to subsequently drop onto the auxiliary conveyor 314 to be carried to the inwardly moving conveyors 336 or 340. Trimming of the plant can be enabled by means of the rotary blade 182 as the plants are moved upwardly between the grip belts 78 and 80. Moreover, additional or alternative trimming can be accomplished on the inwardly moving conveyors by means 342 if desired.

We claim:

1. A celery-harvesting machine comprising a self-propelled vehicle, support means extending from said vehicle for supporting a plurality of harvester units, each harvester unit including a downwardly inclined driven grip belt conveyor means formed of two grip belts extending forwardly parallel to the forward direction of movement of said vehicle and having two inwardly facing spaced flights moving upwardly from front to rear for grasping the tops of celery plants entering between said grip belts, root-severing means for severing the roots of each plant immediately below the soil line as each plant is grasped by said grip belts and a generally horizontal pair of outer foliage removing driven belts respectively oriented in vertical alignment with said grip belts for engaging the outer branches of each plant and stripping the outer branches from the plant following the severing of the roots of each plant.

2. The invention of claim 1 wherein said support means includes a pair of horizontal support arms respectively extending forwardly of said vehicle from the upper ends of two main vertical support stanchions extending upwardly from the side of said vehicle.

3. The invention of claim 1 additionally including top-severing means provided adjacent said right and left transverse conveyor means for severing the tops from said plants prior to delivery of said plants to said central unloading station.

4. The invention of claim 2 additionally including a horizontal lift beam extending transversely from a point adjacent the forward ends of said horizontal support arms, a transversely extending horizontal pivot bearing support beam extending between and outwardly from said first and second main vertical support stanchions and flexible means connected between each harvester unit and power means supported from said lift beam to lift the forward end of each harvester unit upwardly to an elevated position upon actuation of said power means.

5. The invention of claim 4 wherein each of said harvester units includes a main pivot frame pivotally connected at its rearmost ends to said horizontal pivot bearing support frame to enable pivotal lifting of the forward end of each harvester unit by said flexible means.

6. The invention of claim 5 wherein each of said main pivot frames includes two aligned guide frames each supporting one of said grip belts.

7. The invention of claim 6 additionally including a horizontally extending power drive train extending transversely from said vehicle above the rearmost end of the harvester unit for providing power for driving the grip belts and foliage-removing belts of each harvester unit.

8. The invention of claim 7 additionally including right and left inwardly moving transverse conveyors for receiving celery plants released from the grip belts at their rearmost end and conveying said plants to a central unloading station.

9. The invention of claim 8 additionally including an auxiliary conveyor associated with each harvester unit for depositing celery plants on said inwardly moving transverse conveyors.

10. The invention of claim 7 additionally including top-severing means provided adjacent said right and left transverse conveyor means for severing the tops from said plants prior to delivery of said plants to said central unloading station.

11. The invention of claim 6 wherein said outer foliage removing pair of driven belts are supported by first and second interconnected horizontal stripping means connected by link means to their respective main pivot frames and each respectively supporting one of said foliage removing belts.

12. The invention of claim 11 additionally including a horizontally extending power drive train extending transversely from said vehicle above the rearmost end of the harvester unit for providing power for driving the grip belts and foliage-removing belts of each harvester unit.

13. The invention of claim 12 additionally including right and left inwardly moving transverse conveyors for receiving celery plants released from the grip belts at their rearmost end and conveying said plants to a central unloading station.

14. The invention of claim 13 additionally including an auxiliary conveyor associated with each harvester unit for depositing celery plants on said inwardly moving transverse conveyors.

15. The invention of claim 14 wherein said harvester units are grouped in a right bank of harvester units, a left bank of harvester units and a central bank of harvester units.

16. The invention of claim 15 additionally including top-severing means provided adjacent said right and left transverse conveyor means for severing the tops from said plants prior to delivery of said plants to said central unloading station.

UNITED STATES PATENT OFFICE
CERTIFICATE OF CORRECTION

Patent No. 3,586,108   Dated June 22, 1971

Inventor(s) George H. Wedgworth & Vernie A. Boots

It is certified that error appears in the above-identified patent and that said Letters Patent are hereby corrected as shown below:

On the front page, the last name of the first inventor should read --Wedgworth--.

Signed and sealed this 16th day of November 1971.

(SEAL)
Attest:

EDWARD M. FLETCHER, JR.  ROBERT GOTTSCHALK
Attesting Officer  Acting Commissioner of Patents